United States Patent [19]

Yamada et al.

[11] 4,196,271

[45] Apr. 1, 1980

[54] ADHESIVE COMPOSITION

[75] Inventors: Akira Yamada; Kaoru Kimura, both of Nagoya, Japan

[73] Assignee: Toagosei Chemical Industry Co., Ltd., Tokyo, Japan

[21] Appl. No.: 753,429

[22] Filed: Dec. 22, 1976

[30] Foreign Application Priority Data

Dec. 24, 1975 [JP] Japan .............................. 50-153425
Dec. 26, 1975 [JP] Japan .............................. 50-155113

[51] Int. Cl.$^2$ .................... C08L 35/06; C08L 35/08
[52] U.S. Cl. ..................................... 525/242; 106/35; 252/182; 252/188.3 R; 525/256; 525/257; 525/258; 525/259; 525/261; 525/262; 526/213; 526/216; 526/261; 526/291; 526/298
[58] Field of Search ............... 106/35, 36, 287 R, 311; 260/465.4, 29.6 H, 29.6 M, 45.85 T, 875, 898; 32/1, 11, 14 R, 15; 526/298, 261; 525/242, 262; 252/182, 188.3 R

[56] References Cited

U.S. PATENT DOCUMENTS

| T889,004 | 8/1971 | Hyche et al. ........................... 168/4 |
| 2,045,080 | 6/1936 | Hagedorn ....................... 260/29.6 M |
| 3,155,685 | 11/1964 | Prill et al. ...................... 260/465.4 X |
| 3,527,841 | 9/1970 | Wicker, Jr. et al. .......... 260/465.4 X |
| 3,728,375 | 4/1973 | Coover, Jr. et al. ............... 260/465.4 |
| 3,741,926 | 6/1973 | Jurecic .................................. 32/15 X |
| 3,825,580 | 7/1974 | Kato et al. ......................... 260/465.4 |
| 3,961,966 | 6/1976 | Brinkmann et al. ............. 106/311 X |
| 3,962,267 | 6/1976 | Suzuki et al. ......................... 32/15 X |
| 4,089,830 | 5/1978 | Tezuka et al. ...................... 106/35 X |

FOREIGN PATENT DOCUMENTS

1529105 10/1978 United Kingdom .

*Primary Examiner*—Theodore E. Pertilla
*Attorney, Agent, or Firm*—Karl W. Flocks

[57] ABSTRACT

An adhesive composition comprising a 2-cyanoacrylate and at least one member selected from the group consisting of substituted or unsubstituted aliphatic carboxylic acids having three or more carboxyl groups, anhydrides thereof, partial esters thereof, aromatic polycarboxylic acids having three or more carboxyl groups and anhydrides thereof. This composition has a high impact strength, is suitable for bonding metallic substrates to one another and is also excellent in resistance to heat, weather, and water.

20 Claims, No Drawings

ADHESIVE COMPOSITION

This invention relates to 2-cyanoacrylate-containing adhesive compositions.

2-Cyanoacrylate-containing adhesives are instantaneously cured at room temperature with a minute quantity of moisture adsorbed on the surface of an adherend and are utilized in various industrial fields in bonding plastics, rubbers, glass, metals, etc.

In metal-to-metal bonding, however, the 2-cyanoacrylate-containing adhesive is used with limit where a high mechanical strength is required, because the adhesive is low in impact strength. That is, the adhesive is used only in temporary bonding.

The 2-cyanoacrylate-containing adhesive contains an ester of 2-cyanoacrylic acid as the main component and very small amounts of a stabilizer, a thickener, a plasticizer, a crosslinking agent, etc. In general, the properties of the adhesive as an instantaneous adhesive are sufficiently improved with an increase in purity of the 2-cyanoacrylate. The modificaton of a 2-cyanoacrylate-containing adhesive by the addition of other components has heretofore been hardly successful because the addition of other components results in deterioration of the instantaneous adhesion or deterioration of the storage stability. However, the present inventors have conducted extensive research on improvement in impact resistance, water resistance, weather resistance, heat resistance and the like in spite of the discrepancy that although the addition of a certain compound is necessary for modifying the 2-cyanoacrylate-containing adhesive, the reduction in purity of the 2-cyanoacrylate-containing adhesive results in loss of the property as instantaneous adhesive.

An object of this invention is to provide a novel, 2-cyanoacrylate-containing adhesive composition.

Another object of this invention is to provide an adhesive composition useful for metal-to-metal bonding.

A further object of this invention is to provide a 2-cyanoacrylate-containing adhesive composition with a high impact strength.

Other objects and advantages of this invention will become apparent from the following description.

According to this invention, there is provided an adhesive composition comprising a 2-cyanoacrylate and at least one member (as an additive) selected from the group consisting of substituted or unsubstituted aliphatic carboxylic acids having three or more carboxyl groups, anhydrides thereof, partial esters thereof, aromatic polycarboxylic acids having three or more carboxyl groups and anhydrides thereof.

Thus, the resistance to impact, water, weather and heat of a 2-cyanoacrylate is improved by the addition of the above-said carboxylic acids or anhydrides or partial esters thereof to the 2-cyanoacrylate.

The 2-cyanoacrylates for use in this invention include all of the common esters of 2-cyanoacrylic acid, such as alkyl 2-cyanoacrylates such as, methyl, ethyl, n-propyl, isopropyl, n-butyl, isobutyl, sec-butyl, tert-butyl, amyl, n-hexyl, heptyl, n-octyl, 2-ethylhexyl, and dodecyl 2-cyanoacrylates; cycloalkyl 2-cyanoacrylates such as cyclohexyl 2-cyanoacrylate; alkenyl 2-cyanoacrylates such as allyl 2-cyanoacrylate; alkinyl 2-cyanoacrylates such as propargyl 2-cyanoacrylate; aralkyl 2-cyanoacrylates such as benzyl 2-cyanoacrylate; aryl 2-cyanoacrylates such as phenyl 2-cyanoacrylate; alkyl Cellosolve 2-cyanoacrylates such as methyl Cellosolve 2-cyanoacrylate, and ethyl Cellosolve 2-cyanoacrylate; haloalkyl 2-cyanoacrylates such as 2-chloroethyl, hexafluoroisopropyl, and trifluoroethyl 2-cyanoacrylates; cyanoalkyl 2-cyanoacrylates such as 2-cyanoethyl 2-cyanoacrylate. The alcohol moiety of the 2-cyanoacrylate has preferably 1 to 12 carbon atoms, more preferably 1 to 6 carbon atoms.

The substituted or unsubstituted aliphatic polycarboxylic acids having three or more carboxyl groups, anhydrides thereof and partial esters thereof, used as additives in this invention, include compounds in which three or more carboxyl groups are attached to alkanes, alkenes, cycloalkanes, and cycloalkenes which may have one or more substituents such as halogens, cyano, ether, ester, amido, amino, carbonyl, nitro, nitroso, phosphate, phosphite, thioether, sulfonate, urethane, isocyanate, phenyl, naphthyl, furan ring, and hydroxyl. Of the substituents, preferably are hydroxyl, ether, thioether, cyano, and ketone groups.

Examples of the above compounds are aconitic acid, propane-1,2,3-tricarboxylic acid, 1-butene-2,3,4-tricarboxylic acid, 1-hexene-2,4,6-tricarboxylic acid, citric acid, butane-1,2,3-tricarboxylic acid, butane-1,2,3,4-tetracarboxylic acid, 1-pentene-2,4,5-tricarboxylic acid, cyclohexane-1,2,4-tricarboxylic acid, cyclohexane-1,2,4,5-tetracarboxylic acid, tetrahydrofuran-tetracarboxylic acid, cyclopentane-tetracarboxylic acid, 3-methylcyclohexene-4,5,6-tricarboxylic acid, ethane-1,1,2,2-tetracarboxylic acid, carboxymethyloxysuccinic acid, 2-oxopropane-1,1,3-tricarboxylic acid, carboxymethylmercaptosuccinic acid, thiodisuccinic acid, nitrilotriacetic acid, ethylenediamine-tetraacetic acid, 1-cyanopropane-1,2,3-tricarboxylic acid, 1-phenylpropane-1,2,3-tricarboxylic acid, 1,2-dibromo-3-methylcyclohexane-4,5,6-tricarboxylic acid, polyacrylic acid, polymaleic acid, maleic acid-styrene copolymers, and maleic acid-methyl vinyl ether copolymers; anhydrides of said acids; and partial esters of said acids. Especially preferable for use are aconitic acid, 1-butene-2,3,4-tricarboxylic acid, butane-1,2,3,4-tetracarboxylic acid, ethane-1,1,2,2-tetracarboxylic acid, 1-hexene-2,4,6-tricarboxylic acid, 1-pentene-2,4,5-tricarboxylic acid, citric acid, and anhydrides of these acids.

The aromatic polycarboxylic acids used as additives in this invention are those which are generally known and in which three or more carboxyl groups, a part or the whole of which may form anhydrides, are attached to an aromatic nucleus which may have one or more other substituents such as, for example, nitro, ester, ether, hydroxyl, halogen, alkyl, aryl, aralkyl, alkene and mercapto groups.

Examples of the above compounds are hemimellitic acid, hemimellitic anhydride, trimellitic acid, trimellitic anhydride, trimesic acid, prehnitic acid, prehnitic anhydride, mellophanic acid, pyromellitic acid, pyromellitic anhydride, benzene-pentacarboxylic acid, mellitic acid, naphthalene-1,4,5-tricarboxylic acid, naphthalene-1,4,5,8-tetracarboxylic acid, pyridine-2,3,4-tricarboxylic acid, pyridine-2,3,4,5-tetracarboxylic acid, and benzophenone-tetracarboxylic acid. Of these compounds, preferable are trimellitic acid, pyromellitic acid, benzophenone-tetracarboxylic acid, and anhydrides of these acids.

Although the exact function of the above-mentioned additives in the present adhesive composition is not clear, these additives have three or more carboxyl groups in the free or anhydride form, and hence they are very reactive. They are considered to have some effect on the anionic polymerization which takes place when the adhesive composition is cured. It is also considered that these additives are incorporated into the cured polymer in some way to improve markedly the adhesiveness of the latter to the substrate surface, thereby improving the impact resistance and other properties of the cured adhesive in the case of bonding metals through the adhesive.

The amount of the present additives added is in the range of from 0.1 to 50,000, preferably from 1 to 5,000 ppm. based on 2-cyanoacrylate. If the amount exceeds the upper limit of this range, both the setting time and the bonding strength are undesirably decreased.

The present adhesive composition may contain other additives usually used in conventional 2-cyanoacrylate-containing adhesives, such as stabilizers, thickeners, plasticizers, and crosslinking agents. Stabilizers such as sulfur dioxide, sulfonic acids, sultones, lactones, boron fluoride, hydroquinone, hydroquinone monomethyl ether, catechol, and pyrogallol may be added in a proportion of 1 to 1,000 ppm.

When a high-viscosity adhesive is required, 2 to 9 percent of polymers such as methyl methacrylate polymer, 2-cyanoacrylate polymer, and acrylic rubber may be added as a thickener. Plasticizers such as dioctyl phthalate, sebacates, and phosphates may be added to improve the flexibility of the cured polymer.

In some cases, small amounts of polyfunctional vinyl monomers such as alkylene diacrylates, alkylene dimethacrylates, trimethylolpropane triacrylate, triallyl isocyanurate and the like are added to make a three-dimensional structure in the cured polymer. The thermal resistance can be improved by the addition of such a monomer.

The adhesive composition of this invention is used in the field where a high impact strength is required, as in the bonding of metals such as steel, stainless steel, copper, brass, aluminum, zinc, tin, ferrite, and the like. It can also be used as an instantaneous adhesive similarly to conventional 2-cyanoacrylate-containing adhesives in bonding other substrates such as plastics, wood, rubber, glass, porcelain, leather, paper, cloth, and yarn.

The present adhesive is also improved, as compared with conventional 2-cyanoacrylate-containing adhesives, in resistance against water, heat, weather, vibration, and chemicals. It manifests thus long-awaited performance characteristics of both instantaneous adhesives and structural adhesives.

The uses for the present adhesive include, in addition to those for the conventional 2-cyanoacrylate-containing adhesives, locking of a threaded fastener or bolt-and-nut; fixing of the portions of a rotary member such as a bearing, a motor shaft, a pulley, a gear, or an axle to be press-fitted to another member; sealing of a gasket, a flange, or a pipe joint; and potting.

The invention is concretely explained below referring to Examples which are merely illustrative but not limitative. In the Examples, all parts and percentages are by weight unless otherwise specified.

EXAMPLE 1

Ethyl 2-cyanoacrylate was admixed with 1,000 ppm. of 1-hexene-2,4,6-tricarboxylic acid, 500 ppm. of hydroquinone, and 50 ppm. of sulfur dioxide. The resulting mixture was stirred for 2 hours at room temperature and then allowed to stand to obtain a composition. The composition thus obtained was subjected to adhesion test in the following way.

Ten pairs of steel test pieces (ASTM D950-54; bonding area, 1 in$^2$), which had been ground with a flat file, were bonded at 25° C. and 60% relative humidity and then allowed to stand under the same conditions for 24 hours.

The setting time of the adhesive was less than one minute. The test thereof according to ASTM D950-54 showed an impact strength of more than 150 kg-cm/in$^2$ (all of the test specimens were not peeled.)

The stability of the composition was satisfactory.

Examples 2 to 16 and Comparative Example 1

Ethyl 2-cyanoacrylate was admixed with 1,000 ppm. of each of the aliphatic polycarboxylic acids shown in Table 1, 300 ppm. of hydroquinone, and 10 ppm. of sulfur dioxide. The resulting mixture was stirred for one hour at 40° C. Steel test pieces (ASTM D950-54) were bonded through the thus obtained composition under the same conditions as in Example 1 and tested for impact strength according to the same method as in Example 1.

The results obtained are shown in Table 1.

Table I

| Example No. | Aliphatic polycarboxylic acid | Impact strength, kg-cm/in$^2$ | Stability |
|---|---|---|---|
| 2 | 1-Butene-2,3,4-tricarboxylic acid | 145 | Good |
| 3 | Aconitic acid | >150 | " |
| 4 | Aconitic anhydride | >150 | " |
| 5 | 1-Pentene-2,4,5-tricarboxylic acid | >150 | " |
| 6 | Ethane-1,1,2,2-tetracarboxylic acid | >150 | " |
| 7 | Carboxymethyloxysuccinic acid | >150 | " |
| 8 | Tetrahydrofuran-tetracarboxylic dianhydride | >150 | " |
| 9 | Thiodisuccinc acid | >150 | " |
| 10 | Nitrilotriacetic acid | 85 | " |
| 11 | Propane-1,2,3-tricarboxylic acid | 143 | " |
| 12 | Partial ester of butane-1,2,3,4-tetracarboxylic acid (n-butyl esterification degree, 25%) | >150 | " |
| 13 | 3-Methylcyclohexene-4,5,6-tricarboxylic acid | >150 | " |
| 14 | Polyacrylic acid | 85 | " |
| 15 | 2-Oxo-propane-1,1,3-tricarboxylic acid | >150 | " |
| 16 | Carboxymethyl-mercaptosuccinic acid | 140 | " |
| Comparative Example 1 | — | 45 | |

EXAMPLE 17

To methyl 2-cyanoacrylate were added 200 ppm. of citric acid, 200 ppm. of hydroquinone monomethyl ether, 10 ppm. of methanesulfonic acid, and 2% of methyl methacrylate polymer. The resulting mixture was stirred for 3 hours at room temperature to obtain a composition having good stability.

In the same manner as in Example 1, 10 pairs of test pieces were bonded through the above composition and tested for impact strength. All of the test specimens showed an impact strength of more than 150 kg-cm/in². The setting time of the adhesive was 50 seconds.

formed in the same manner as in Example 19 are shown in Table 2.

Table 2

| Example No. | $CH_2=C(CN)-CO_2R$ R | Amount added, parts | Thickener or plasticizer Compound | Amount added, parts | Aromatic polycarboxylic acid or anhydride thereof Compound | Amount added, parts | Impact strength (steel-steel bond), kg-cm/in² |
|---|---|---|---|---|---|---|---|
| 20 | Ethyl | 99.9 | — | — | Benzene-pentacarboxylic acid | 0.1 | >150 |
| 21 | " | 99.95 | — | — | Pyromellitic anhydride | 0.05 | >150 |
| 22 | " | 89.95 | Me methacrylate polymer | 10 | Pyromellitic anhydride | 0.05 | >150 |
| Comp. Example 2 | " | 90 | Me methacrylate polymer | 10 | — | 0.01 | 28 |
| 23 | " | 99.99 | — | — | Mellitic acid | 0.01 | >150 |
| 24 | Iso-butyl | 99.9 | — | — | Pyromellitic anhydride | 0.1 | >150 |
| Comp. Example 3 | Iso-butyl | 100 | — | — | — | — | 32 |
| 25 | Ethyl | 99.99 | — | — | Pyromellitic anhydride | 0.01 | 142 |

EXAMPLE 18 n-Butyl 2-cyanoacrylate was admixed with 1,000 ppm. of prpane-1,2,3-tricarboxylic acid, 300 ppm. of hydroquinone, and 2% of trimethylolpropane triacrylate to obtain a composition having good stability.

In the same manner as in Example 1, test pieces were bonded through the above composition and tested for impact strength. The impact strength was found to be more than 150 kg-cm/in². The same procedure as above was repeated except that the propane-1,2,3-tricarboxylic acid was not added. The impact strength obtained was only 40 to 50 kg-cm/in².

EXAMPLE 19

To 99.99 parts of ethyl 2-cyanoacrylate containing 10 ppm. of sulfur dioxide and 300 ppm. of hydroquinone as stabilizer was added 0.01 part of pyromellitic anhydride. The resulting mixture was brought into solution by shaking at room temperature to obtain an adhesive. Ten pairs of steel test pieces, the bonding areas of which had been ground with a smooth-cut file, were coated with the above adhesive and each pair of pieces were adhered while mildly pressing with fingers. The adhesive was cured in 40 sec. The test specimens thus adhered were allowed to stand at 20° C. and 50% relative humidity for 24 hours, and tested for impact strength in the same manner as in Example 1.

Eight of the ten test specimens showed an strength higher than 150 kg-cm/in², which is the maximum value of the tester and showed no peeling. The remaining two specimens also showed impact strengths as high as 140 and 145 kg-cm/in², respectively. For comparison, a conventional ethyl 2-cyanoacrylate-containing adhesive was tested under the same conditions as mentioned above and found to have an impact strength of only 30 kg-cm/in².

Examples 20 to 30 and Comparative Examples and 3

Adhesive compositions were prepared in the same manner as in Example 19, except that the 2-cyanoacrylates and carboxylic acids or anhydrides shown in Table 2 were used. The results of impact strength test per-

EXAMPLE 26

An adhesive was prepared by adding 0.1 part of naphthalene-1,4,5,8-tetracarboxylic acid to 99.9 parts of ethyl 2-cyanoacrylate containing as stabilizers 20 ppm. of p-toluenesulfonic acid and 300 ppm. of hydroquinone methyl ether. Ten pairs of steel test pieces, the bonding areas of which had been ground with a smoothcut file, were coated with the above adhesive and each pair were bonded to obtain test specimens. The thus adhered specimens were allowed to stand under an atmosphere at 20° C. and 50% relative humidity for 24 hours, and then tested for impact strength in the same manner as in Example 1. All of the test specimens showed no peeling and had an impact strength of more than 150 kg-cm/in². The above adhesive showed good stability, no gelation having been observed after storage for several months at room temperature.

EXAMPLE 27

An adhesive composition was prepared by adding 0.05 part of prehnitic anhydride to 99.95 parts of ethyl 2-cyanoacrylate containing 100 ppm. of hydroquinone alone and subjected to the impact test in the same manner as in Example 19. The impact strength was higher than 150 kg-cm/in². The stability of the above adhesive composition was so good as to be comparable to that of the composition containing sulfur dioxide.

EXAMPLE 28

To ethyl 2-cyanoacrylate containing 500 ppm. of hydroquinone monomethyl ether and 100 ppm. of SO₂ was added 300 ppm. of benzophenone-tetracarboxylic anhydride to obtain an adhesive. Each of ten pairs of steel test pieces were bonded through the resulting adhesive, and allowed to stand in an atmosphere at 20° C. and 50% relative humidity for 24 hours, after which the bonded test pieces were subjected to measurement of impact strength in the same manner as in Example 1. The average impact strength of the bonded pieces was 135 kg-cm/in².

EXAMPLES 29 to 32

To ethyl 2-cyanoacrylate containing 500 ppm. of hydroquinone and 100 ppm. of $SO_2$ was added a polycarboxylic acid (or anhydride) as shown in Table 3 to obtain an adhesive. Using the thus obtained adhesives, the same test as in Example 1 was effected to obtain the results shown in Table 3.

Table 3

| Example No. | Additive | Amount added (ppm.) | Impact strength (kg-cm/in$^2$) | Stability |
|---|---|---|---|---|
| 29 | Aconitic acid | 100 | >150 | Good |
|    | Benzophenone-tetracarboxylic anhydride | 500 | | |
| 30 | Butane-1,2,3,4-tetracarboxylic anhydride | 300 | >150 | Good |
|    | Trimellitic acid | 500 | | |
| 31 | 1-Butene-2,3,4-tricarboxylic acid | 200 | >150 | Good |
|    | Pyromellitic anhydride | 200 | | |
| 32 | Pyromellitic acid | 100 | 140 | Good |
|    | Benzophenone-tetracarboxylic anhydride | 100 | | |

EXAMPLE 33

An adhesive was prepared by mixing 30% of methyl 2-cyanoacrylate and 70% of ethyl 2-cyanoacrylate with 1,000 ppm. of trimellitic anhydride and 1,000 ppm. of hydroquinone. Using the adhesive, the same impact strength test as in Example 1 was effected to find that the impact strength was more than 150 kg-cm/in$^2$.

EXAMPLE 34

An adhesive was prepared by mixing 60% of methyl 2-cyanoacrylate and 40% of ethyl 2-cyanoacrylate with 300 ppm. of thiodisuccininc acid, 50 ppm. of p-toluenesulfonic acid, 500 ppm. of catechol and 10 parts, per 100 parts of the two 2-cyanoacrylates, of polymethyl methacrylate having an average molecular weight of about 700,000 at 50° C. Using the adhesive, the same impact test as in Example 1 was effected to find that the impact strength of each test specimen was more than 150 kg-cm/in$^2$.

What is claimed is:

1. An adhesive composition comprising a 2-cyanoacrylate and, as an impact strength improving additive, at least one member selected from the group consisting of substituted and unsubstituted aliphatic carboxylic acids having three or more free carboxyl groups, anhydrides thereof, partial esters thereof having at least three free carboxyls, aromatic polycarboxylic acids having three or more free carboxyl groups and anhydrides thereof, said additive being present in an amount sufficient to improve impact strength.

2. The adhesive composition according to claim 1, wherein the 2-cyanoacrylate is an alkyl 2-cyanoacrylate, an alkenyl 2-cyanoacrylate, a cycloalkyl 2-cyanoacrylate, a cycloalkenyl 2-cyanoacrylate, an alkenyl 2-cyanoacrylate, an aralkyl 2-cyanoacrylate, an aryl 2-cyanoacrylate, an alkyl Cellosolve 2-cyanoacrylate, a haloalkyl 2-cyanoacrylate, or a cyanoalkyl 2-cyanoacrylate.

3. The adhesive composition according to claim 2, wherein the 2-cyanoacrylate has an alcohol moiety containing 1 to 12 carbon atoms.

4. The adhesive composition according to claim 3, wherein the alcohol moiety of the 2-cyanoacrylate has 1 to 6 carbon atoms.

5. The adhesive composition according to claim 1, wherein the 2-cyanoacrylate is methyl, ethyl, n-propyl, isopropyl, n-butyl, isobutyl, sec-butyl, tert-butyl, amyl, n-hexyl, heptyl, n-octyl, 2-ethylhexyl, dodecyl, cyclohexyl, allyl, propargyl, benzyl, phenyl, methyl Cellosolve, ethyl Cellosolve, 2-chloroethyl, hexafluoroisopropyl, trifluoroethyl, or 2-cyanoethyl 2-cyanoacrylate.

6. The adhesive composition according to claim 1, wherein the additive is at least one member selected from the group consisting of substituted and unsubstituted aliphatic carboxylic acids having three or more carboxyl groups, anhydrides thereof and partial esters thereof.

7. The adhesive composition according to claim 6, wherein the additive is at least one compound selected from the group consisting of alkanes, alkenes, cycloalkanes, and cycloalkenes each having three or more carboxyl groups; alkanes, alkenes, cycloalkanes, and cycloalkenes each having three of more carboxyl groups and at least one substituent selected from the group consisting of halogens, cyano, ether, ester, amido, amino, carbonyl, nitro, nitroso, sulfide, phosphate, phosphite, mercaptan, sulfonate, urethane, isocyanate, phenyl, naphthyl, furanyl, and hydroxyl; and anhydrides and partial esters of these compounds.

8. The adhesive composition according to claim 6, wherein the additive is at least one compound selected from the group consisting of aconitic acid, propane-1,2,3-tricarboxylic acid, 1-butene-2,3,4-tricarboxylic acid, 1-hexene-2,4,6-tricarboxylic acid, citric acid, butane-1,2,3-tricarboxylic acid, butane-1,2,3,4-tetracarboxylic acid, 1pentene 2,4,5-tricarboxylic acid, cyclohexane-1,2,4-tricarboxylic acid, cyclohexane-1,2,4,5-tetracarboxylic acid, tetrahydrofuran-tetracarboxylic acid, cyclopentane-tetracarboxylic acid, 3-methylcyclohexene-4,5,6-tricarboxylic acid, ethane-1,1,2,2-tetracarboxylic acid, carboxymethyloxysuccinic acid, 2-oxopropane-1,1,3-tricarboxylic acid, carboxymethylmercaptosuccinic acid, thiodisuccinic acid, nitrilotriacetic acid, ethylenediamine-tetraacetic acid, 1-cyanopropane-1,2,3-tricarboxylic acid, 1-phenylpropane-1,2,3-tricarboxylic acid, 1,2-dibromo-3-methylcyclohexane-4,5,6-tricarboxylic acid, polyacrylic acid, polymaleic acid, maleic acid-styrene copolymers, maleic acid-methyl vinyl ether copolymers, and anhydrides and partial esters of these compounds.

9. The adhesive composition according to claim 6, wherein the additive is at least one member selected from the group consisting of aconitic acid, 1-butene-2,3,4-tricarboxylic acid, butane-1,2,3,4-tetracarboxylic acid, ethane-1,1,2,2-tetracarboxylic acid, 1-hexene-2,4,6-tricarboxylic acid, 1-pentene-2,4,5-tricarboxylic acid, citric acid, and anhydrides of these acids.

10. The adhesive composition according to claim 1, wherein the additive is at least one compound selected from the group consisting of aromatic polycarboxylic acids having three or more carboxyl groups and anhydrides thereof.

11. The adhesive composition according to claim 10, wherein the additive is at least one compound selected from the group consisting of hemimellitic acid, hemimellitic anhydride, trimellitic acid, trimellitic anhydride, trimesic acid, prehnitic acid, prehnitic anhydride, mellophanic acid, pyromellitic acid, pyromellitic anhydride, benzene-pentacarboxylic acid, mellitic acid, naphthalene-1,4,5-tricarboxylic acid, naphthalene-1,4,5,8-tetracarboxylic acid, pyridine-2,3,4-tricarboxylic acid, pyridine-2,3,4,5-tetracarboxylic acid, and benzophenone-tetracarboxylic acid.

12. The adhesive composition according to claim 10, wherein the additive is at least one compound selected from the group consisting of trimellitic acid, pyromellitic acid, and benzophenone-tetracarboxylic acid.

13. The adhesive composition according to claim 1, wherein the amount of the additive is 0.1 to 50,000 ppm. based on 2-cyanoacrylate.

14. The adhesive composition according to claim 1, wherein the amount of the additive is 1 to 5,000 ppm. based on 2-cyanoacrylate.

15. The adhesive composition according to claim 1, wherein the composition further contains a stabilizer, a thickener, a plasticizer, or a crosslinking agent.

16. The adhesive composition according to claim 1, wherein the 2-cyanoacrylate is methyl cyanoacrylate and the additive is aconitic acid.

17. The adhesive composition according to claim 1, wherein the 2-cyanoacrylate is ethyl 2-cyanoacrylate and the additive is aconitic acid.

18. The adhesive composition according to claim 1 further comprising 2-9% of a polymeric thickener.

19. The adhesive composition according to claim 1 further comprising a small amount of an alkylene diacrylate, alkylene dimethacrylate, trimethylolpropane triacrylate or triallyl isocyanurate.

20. In an adhesive composition comprising as the major ingredient a 1-cyanoacrylate, the improvement wherein
said composition further including an impact strength improving additive selected from the group consisting of substituted and unsubstituted aliphatic carboxylic free acids having three or more carboxyl groups, anhydrides thereof, partial ester thereof, aromatic polycarboxylic free acids having three or more carboxyl groups and anhydrides thereof, said additive being present in an amount of 0.1 to 50,000 ppm. of the free acid containing additive based on the amount of 2-cyanoacrylate.

* * * * *